US010853687B2

(12) United States Patent
Yan et al.

(10) Patent No.: US 10,853,687 B2
(45) Date of Patent: Dec. 1, 2020

(54) METHOD AND APPARATUS FOR DETERMINING MATCHING RELATIONSHIP BETWEEN POINT CLOUD DATA

(71) Applicant: Baidu Online Network Technology (Beijing) Co., Ltd., Beijing (CN)

(72) Inventors: Miao Yan, Beijing (CN); Yifei Zhan, Beijing (CN); Wang Zhou, Beijing (CN); Xiong Duan, Beijing (CN); Xianpeng Lang, Beijing (CN); Changjie Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/232,720

(22) Filed: Dec. 26, 2018

(65) Prior Publication Data
US 2019/0205695 A1    Jul. 4, 2019

(30) Foreign Application Priority Data

Dec. 29, 2017 (CN) .......................... 2017 1 1478277

(51) Int. Cl.
*G06K 9/62* (2006.01)
*G06K 9/00* (2006.01)
*G06T 7/30* (2017.01)

(52) U.S. Cl.
CPC ....... *G06K 9/6202* (2013.01); *G06K 9/00201* (2013.01); *G06K 9/6211* (2013.01);
(Continued)

(58) Field of Classification Search
None
See application file for complete search history.

(56) References Cited

U.S. PATENT DOCUMENTS

2015/0123995 A1   5/2015  Zavodny et al.
2015/0154199 A1*  6/2015  Akman ............ G06F 16/24578
                                                              707/737
(Continued)

FOREIGN PATENT DOCUMENTS

CN    101839701 A      9/2010
JP    A2014153336      8/2014
(Continued)

OTHER PUBLICATIONS

Elbaz et al., "Registration of Point Cloud based on Global Super-Point Features using Auto Encoder Deep Neural Network," Proceedings of the 34th Israeli Conference of Mechanical Engineering, Faculty of Mechanical Engineering, Technion I.I.T Haifa, Nov. 21-22, 2016, pp. 2.
(Continued)

*Primary Examiner* — David Perlman
(74) *Attorney, Agent, or Firm* — Knobbe, Martens, Olson & Bear, LLP

(57) ABSTRACT

Embodiments of the present disclosure can provide a method, apparatus and computer readable storage medium for determining a matching relationship between point cloud data. The method can include extracting a first characteristic associated with first point cloud data and a second characteristic associated with second point cloud data. The first point cloud data and the second point cloud data are acquired for the same object. The method can further include performing characteristic matching between the first characteristic and the second characteristic. In addition, the method can further include determining, based on the characteristic matching, a matching relationship between the first point cloud data and the second point cloud data.

17 Claims, 3 Drawing Sheets

(52) U.S. Cl.
CPC ......... *G06K 9/6215* (2013.01); *G06K 9/6218* (2013.01); *G06T 7/30* (2017.01); *G06T 2207/10028* (2013.01); *G06T 2207/30252* (2013.01)

(56) References Cited

U.S. PATENT DOCUMENTS

| | | |
|---|---|---|
| 2015/0254857 A1 | 9/2015 | Huang et al. |
| 2015/0269454 A1 | 9/2015 | Kanezaki et al. |
| 2019/0043255 A1* | 2/2019 | Somasundaram .... G06T 17/205 |

FOREIGN PATENT DOCUMENTS

| | | |
|---|---|---|
| JP | 2017-009616 A | 1/2017 |
| JP | A2017004228 | 1/2017 |
| JP | A2017166933 | 9/2017 |

OTHER PUBLICATIONS

Vosselman et al., "Contextual segment-based classification of airborne laser scanner data," ISPRS Journal of Photogrammetry and Remote Sensing, Apr. 26, 2017, vol. 128, pp. 354-371.

* cited by examiner

METHOD AND APPARATUS FOR DETERMINING MATCHING RELATIONSHIP BETWEEN POINT CLOUD DATA

CROSS-REFERENCE TO RELATED APPLICATIONS

This application claims priority to Chinese Application No. 201711478277.5, filed on Dec. 29, 2017 and entitled "Method and Apparatus for Determining Matching Relationship Between Point Cloud Data," the entire disclosure of which is hereby incorporated by reference.

TECHNICAL FIELD

Embodiments of the present disclosure mainly relate to the field of point cloud data processing, and more specifically to a method and apparatus for determining a matching relationship between point cloud data.

BACKGROUND

In high-precision mapping, it is necessary to accurately recognize a three-dimensional map environment. At the same time, in the broad sense, autonomous vehicles also need to recognize three-dimensional dynamic targets for simulation purposes. In addition, various three-dimensional objects need to be recognized and compared in the fields of component manufacturing, quality inspection, diversified view, cartoon production, three-dimensional mapping, mass communication tools, etc. Currently, in the fields such as the above-mentioned, three-dimensional object recognition may generally be achieved by acquiring point cloud data and performing analysis.

A point cloud usually refers to a set of massive points. In the fields of high-precision mapping and autonomous driving vehicles, a point cloud generally refers to a set of massive points having surface characteristics existing on the road and in the surrounding environment, which may be used to represent the surface shape of objects such as roads, barriers, and billboards. Point cloud data refers to data used to represent a point cloud. In the point cloud data, attributes such as three-dimensional coordinates and other attributes (e.g., light intensity, RGB color, gray value, depth, etc.) of various points in the point cloud are recorded. The point cloud data may be obtained, for example, by scanning a point cloud acquisition environment using a three-dimensional scanning device. The three-dimensional scanning device may include a lidar, a stereo camera, a time-of-flight camera, and the like. These devices can measure information of large number of points on the surfaces of the objects automatically and then output point cloud data in the form of a data file format.

When using the acquired point cloud data for subsequent operations, especially for comprehensive use of the point clouds acquired dynamically or through a plurality of acquisitions, it is generally considered that the removal of point cloud ghost of dynamic targets is a technical point. Since the point cloud data is used to represent point clouds, it is determined that the matching relationship between the point clouds is directly related to the determination of the matching relationship between the point cloud data. A conventional method for determining a matching relationship between point cloud data, such as the Iterative Closest Point (ICP) algorithm, uses almost all the point cloud data (i.e., related data for almost all points in the point clouds) to determine the matching relationship between different point cloud data. In the above conventional method, points having specific characteristics in a point cloud are manually extracted from point cloud data for the same object, for determining the matching relationship between the point cloud data. However, performing manual extraction puts forward very strict requirements for point cloud data. Only when the amount of data of the points in the point cloud is large enough and the acquisition accuracy is high enough, can some details such as corresponding corners in the point cloud be found, requiring for an investment of a lot of labor costs.

At the same time, since the number of points in the point cloud is usually very large, the above conventional method requires a large amount of intensive computation in determining the matching relationship between different point cloud data, thus consuming a lot of time and memory space.

In addition, when an in-vehicle laser point cloud is acquired, for example, using an in-vehicle lidar, the acquired in-vehicle laser point cloud has a non-rigid deformation characteristic. However, the conventional method such as the ICP algorithm is generally only applicable to point clouds having rigid deformation characteristics. Therefore, using the conventional method cannot guarantee good accuracy in determining the matching relationship between large-scale in-vehicle laser point cloud data, and thus unable to fulfill the requirement of non-rigid transformation when determining the matching relationship between point cloud data.

Furthermore, the conventional method determines the matching relationship for 6 degrees of freedom simultaneously when determining a matching relationship between point cloud data, which requires a high operation speed and a large memory space.

SUMMARY

Embodiments of the present disclosure provide a method and apparatus for determining a matching relationship between point cloud data.

In a first aspect, the present disclosure provides a method for determining a matching relationship between point cloud data. The method includes: extracting a first characteristic associated with first point cloud data and a second characteristic associated with second point cloud data. The first point cloud data and the second point cloud data are acquired for the same object. The method further includes performing characteristic matching between the first characteristic and the second characteristic. In addition, the method further includes determining, based on the characteristic matching, a matching relationship between the first point cloud data and the second point cloud data.

In a second aspect, the present disclosure provides an apparatus for determining a matching relationship between point cloud data. The apparatus includes: an extraction module, configured to extract a first characteristic associated with first point cloud data and a second characteristic associated with second point cloud data, the first point cloud data and the second point cloud data being acquired for the same object; a matching module, configured to perform characteristic matching between the first characteristic and the second characteristic; and a determination module, configured to determine, based on the characteristic matching, a matching relationship between the first point cloud data and the second point cloud data.

In a third aspect, the present disclosure provides a device, including one or more processors; and a storage apparatus, for storing one or more programs, the one or more programs, when executed by the one or more processors, cause the one or more processors to implement the method according to the first aspect of the present disclosure.

In a fourth aspect, the present disclosure provides a computer readable storage medium, storing a computer program thereon, the computer program, when executed by a processor, implements the method according to the first aspect of the present disclosure.

The Summary is provided to introduce the selection to the concepts in a simplified form, which are further described in the Detailed Description of Embodiments. The Summary of the present disclosure is not intended to identify key features or essential features of the present disclosure, or to limit the scope of the present disclosure.

BRIEF DESCRIPTION OF THE DRAWINGS

The above and other objectives, features and advantages of the present disclosure will become more apparent, by a more detailed description of exemplary embodiments of the present disclosure with reference to the accompanying drawings. In the exemplary embodiments of the present disclosure, the identical reference numbers generally refer to the identical components.

In the accompanying drawings, the identical or corresponding reference numerals refer to the identical or corresponding parts.

DETAILED DESCRIPTION OF EMBODIMENTS

Figure 1:
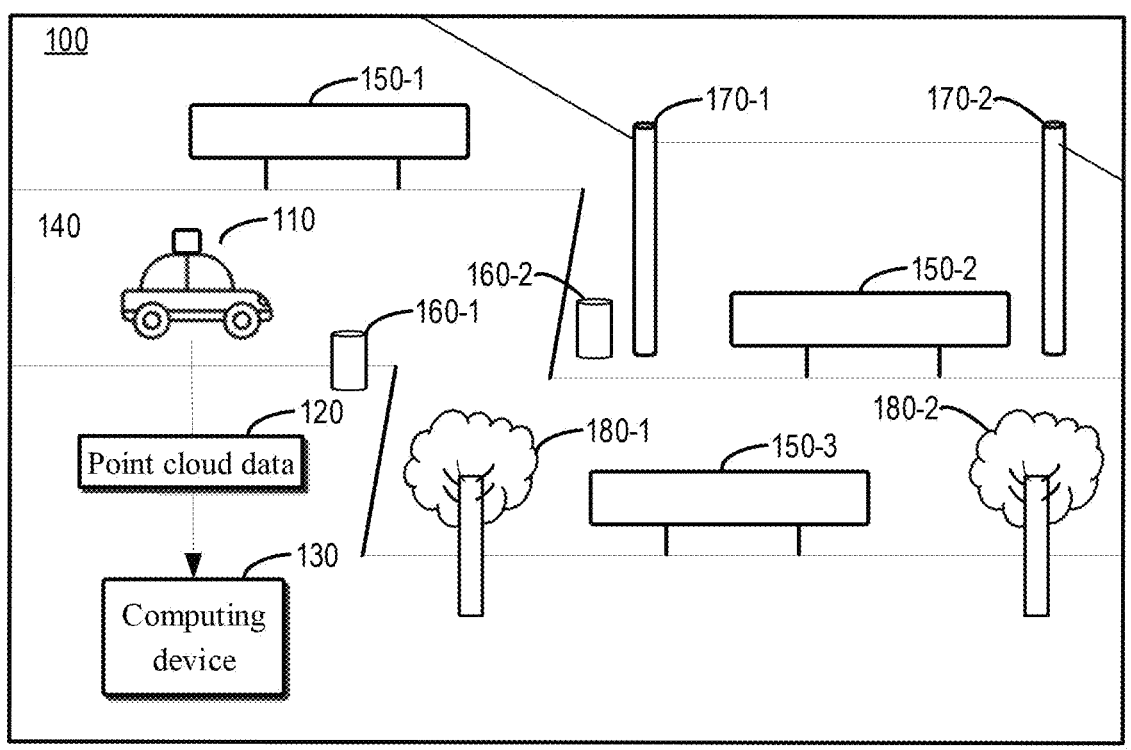
FIG. 1 illustrates a schematic diagram 100 of an environment in which embodiments of the present disclosure may be implemented.

Preferable embodiments of the present disclosure will be described in more detail below with reference to the accompanying drawings. Although preferable embodiments of the present disclosure are shown in the accompanying drawings, it should be understood that the present disclosure may be implemented in a variety of forms, and should not be construed as being limited to the embodiments set forth herein. Rather, the embodiments are provided so that the present disclosure will be thorough and complete, and the scope of the present disclosure will be fully conveyed by those skilled in the art.

The term "include" and variants thereof used in the present disclosure indicate open-ended inclusion, i.e., "including but not limited to." Unless specifically stated otherwise, the term "or" indicates "and/or." The term "based on" indicates "at least partially based on." The term "an exemplary embodiment" and "one embodiment" indicate "at least one embodiment." The term "another embodiment" indicates "at least one additional embodiment." The terms "first," "second," and the like may refer to different or identical objects. Other explicit and implicit definitions may also be included below.

As described above in the Background, in the existing technology, a large amount of intensive calculation is required in determining the matching relationship between different point cloud data, thus consuming a lot of time and memory space. At the same time, when determining the matching relationship for the in-vehicle laser point cloud data having non-rigid deformation characteristics, the conventional method cannot guarantee good accuracy in determining the matching relationship between large-scale in-vehicle laser point cloud data. The above problems seriously affect the application and development of point clouds in various fields.

In order to at least partially solve the above problems and one or more other potential problems, the embodiments of the present disclosure propose a method and apparatus for determining a matching relationship between point cloud data. According to an embodiment of the present disclosure, a method capable of implementing a matching relationship between point cloud data automatically, quickly, and with high accuracy is provided.

In this method, points in a point cloud are classified into a plurality of categories according to specific attributes of different points included in the point cloud. The categories of points include, for example, ground points, planar points, and columnar points. The ground point refers to a point at a ground location in the measured environment. The planar point refers to a point on a plane that is perpendicular or at some other specific angle to the ground location in the measured environment, and such plane may include, for example, the exterior surface of a building, a billboard, and the like. The columnar point refers to a point on the surface of a column that is perpendicular or at some other specific angle to the ground location in the measured environment, and such column may include, for example, a utility pole, a tree, a trash can, and the like. It should be understood that the categories of points in the point cloud do not only include the ground point, the planar point, and the columnar point, but may include other categories such as a sphere point, a ground corner point, and a high reflectivity point. Different shapes that may be used for comparison may be used as categories of points in the point cloud, as long as the shapes exist in the acquisition environment of the point cloud.

After classifying different points included in the point cloud into a plurality of categories, the distinctive attributes of the points of different categories may be used to generate new characteristics from the points of different categories. Then, by comparing the characteristics generated from the points of corresponding categories in the different point clouds, it may be determined whether the different point clouds match, and then the matching relationship between the different point clouds may be determined. In an embodiment of the present disclosure, the term "characteristic" may include a characteristic point, a normal vector corresponding to the characteristic point, and other auxiliary attributes. These auxiliary attributes include, for example, the radius and height of the column and the side length of the patch plane to which the characteristic point is directed.

In some embodiments of the present disclosure, the different characteristics described above may include a plurality of generated abstract characteristic points and normal vectors corresponding to the characteristic points. In some embodiments of the present disclosure, the matching relationship between different point clouds includes a spatial transformation relationship between the different point clouds, for example, how a point cloud is transformed into another point cloud through operations such as rotation, translation, and angle transformation, i.e., substantially coincides in position with each point in the other point cloud. At the same time, the process of determining the matching relationship between different point clouds may also be referred to as registration between point clouds.

Since the method only needs to register different characteristics generated from the points in the point clouds without registering for all the points in the point clouds, the amount of calculation required for the registration may be greatly reduced. At the same time, since the points in the point cloud are classified into different categories, and the points of different categories correspond to different degrees of freedom, it is possible to register only part of the degrees of freedom at the time of registration, without simultaneously registering for 6 degrees of freedom. Thus, computing resources and storage resources may be saved, and the operation speed may be improved.

The embodiments of the present disclosure are specifically described below with reference to the accompanying drawings.

FIG. 1 illustrates a schematic diagram 100 of an environment in which embodiments of the present disclosure may be implemented. The schematic diagram 100 mainly illustrates an acquisition environment for point clouds and the corresponding point cloud data involved in some embodiments of the present disclosure.

An acquisition entity 110 is shown in FIG. 1 for acquiring a point cloud for an acquisition environment, generating corresponding point cloud data 120, and transmitting the point cloud data 120 to a computing device 130. In FIG. 1, the acquisition entity 110 is shown in the form of an acquisition car. It should be understood that the acquisition entity 110 for acquiring the point cloud data 120 in the present disclosure is not limited to the acquisition car, but may be any entity having point cloud acquisition capabilities, such as various vehicles. At the same time, the acquisition entity 110 may also be a variety of entities that integrate or host devices having point cloud acquisition capabilities. The point cloud data 120 acquired by the acquisition entity 110 is subsequently processed by the computing device 130. It should be understood that the acquisition entity 110 may transmit the point cloud data 120 to the computing device 130 in any form of data transmission, such as wired or wireless data transmission. This transmission does not need to be real-time transmission. No matter when or in what form the point cloud data 120 is transmitted to the computing device 130, subsequent processing of the point cloud data 120 by the computing device 130 is not affected.

In an embodiment of the present disclosure, the point cloud data is data of points of the outer surfaces of various objects in the acquisition environment obtained by the acquisition entity 110 using a lidar to scan the acquisition environment 360 degrees. According to the vertical angular resolution of the scanning, a piece of n×m data may be obtained, where n is the number of scanning lines in the vertical direction, also referred to as the number of threads, and m is the data obtained after a 360-degree scanning by the scanning line in the horizontal direction. For the vertical angular resolution, for example, assuming that the scanning height is data within 10 degrees, if the vertical angular resolution is set to be 2.5 degrees, 10÷2.5=4 threads are scanned. It should be understood that since the acquisition entity 110 has a certain height, when performing a point cloud scanning, scanning is usually started from an angle that is negative (for example, −2.5 degrees) from the horizontal plane, so as to obtain scanning data for the horizontal plane as the ground. It should be understood that the above numerical values are for illustrative purposes only and are not intended to limit the scope of the present disclosure in any form.

Also shown in FIG. 1 are various objects in the acquisition environment, including a road 140, billboards 150-1, 150-2, and 150-3 (collectively referred to as billboard 150), trash cans 160-1 and 160-2 (collectively referred to as trash can 160), utility poles 170-1 and 170-2 (collectively referred to as utility pole 170), and trees 180-1 and 180-2 (collectively referred to as tree 180). In the above objects, the data of point clouds acquired from the surface of the road 140 constitutes ground point cloud data, the data of point clouds acquired from the surface of the billboard 150 which is a facet and substantially perpendicular to the road 140 constitutes planar point cloud data, and the data of point clouds acquired from the surfaces of the trash can 160, the utility pole 170, and the tree 180 having shapes as columns of different lengths and diameters constitutes columnar point cloud data.

It should be understood that since the data obtained through point cloud acquisition include the locations and related attributes of the acquired points, the categories of the points cannot be directly determined based on the points in the acquired point cloud only. Instead, the point cloud data of different categories such as the corresponding ground point cloud data, planar point cloud data and columnar point cloud data must be determined from the point cloud data 120 through subsequent operations. The content shown in FIG. 1 may also be understood as an exemplary scenario for performing point cloud acquisition, where after the point cloud acquisition, it cannot be directly determined that the acquired point cloud is from the road 140, the billboard 150, the trash can 160, the utility pole 170, or the tree 180, rather, it is necessary to determine the point cloud data 120 of different categories from the point cloud data 120 by subsequent operations in accordance with the flow of the method as described below with reference to FIG. 2.

Figure 2:
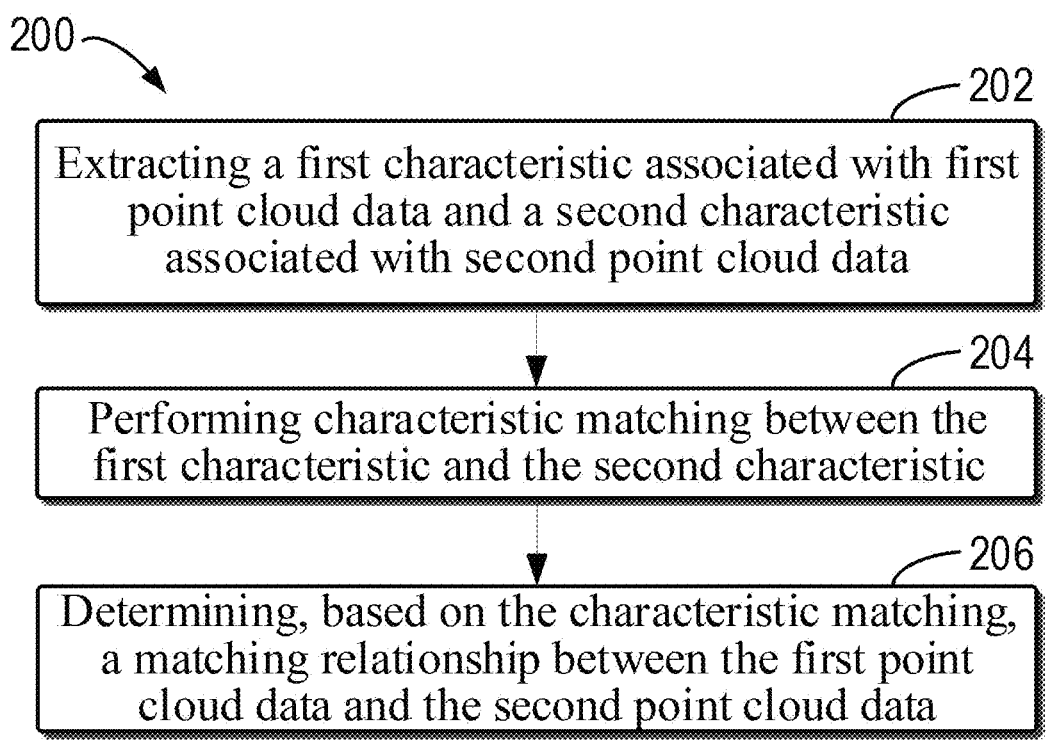
FIG. 2 illustrates a flowchart of a method 200 for determining a matching relationship between point cloud data according to an embodiment of the present disclosure.

FIG. 2 illustrates a flowchart of a method 200 for determining a matching relationship between point cloud data according to an embodiment of the present disclosure. The method 200 may be performed, for example, by the computing device 130 of FIG. 1. Through the method 200, the matching relationship between the point cloud data 120 may be determined for different point cloud data 120 acquired from the acquisition entity 110.

In an embodiment of the present disclosure, the matching relationship between the point cloud data 120 is determined primarily for point cloud data 120 acquired by the acquisition entity 110 at different times at the same or substantially the same location. Due to inherent factors such as the location and angle of the acquisition entity 110, and external factors such as weather effects that may exist in the acquisition environment, the point cloud data acquired by the acquisition entity 110 at the same location and at different times may not be identical. Therefore, for the subsequent operations, it is necessary to determine the matching relationship between these point cloud data 120 acquired at different times. Here, the first point cloud data 120-1 and the second point cloud data 120-2 acquired by the acquisition entity 110 at the same location and at different times will be described as an example.

It should be understood that the technical solution of the present disclosure may also be applied to registration between point cloud data 120 acquired by different acquisition entities 110 at substantially the same location. It should be understood that the method 200 may also include additional steps not shown and/or may omit the steps shown, and the scope of the present disclosure is not limited in this respect.

The method 200 starts at block 202. At block 202, the computing device 130 extracts a characteristic associated with the first point cloud data 120-1 (hereinafter referred to as the "first characteristic") and a characteristic associated with the second point cloud data 120-2 (hereinafter referred to as the "second characteristic"). As described above, since the acquisition device 110 acquires the first point cloud data 120-1 and the second point cloud data 120-2 at the same location and at different times, the first point cloud data 120-1 and the second point cloud data 120-2 may be considered as acquired for the same object (i.e., the same acquisition environment).

In an embodiment of the present disclosure, in combination with the previously described content, the first characteristic and the second characteristic may include characteristic points determined based on the first point cloud data 120-1 and the second point cloud data 120-2, respectively, normal vectors corresponding to the characteristic points, and other auxiliary attributes. The auxiliary attributes include, for example, the radius and height of the column and the side length of the patch plane to which the characteristic point is directed. Based on the difference in categories of the points in the point cloud, the process steps of extracting the first characteristic and the second characteristic are not identical, and the extracted first characteristic and the second characteristic include, for example, different numbers of characteristic points and characteristics of the normal vectors, and the contents of the characteristics included in the extracted first characteristic and second characteristic are also different.

The process of extracting characteristics from the point cloud data 120 is described below for the ground point cloud data, the planar point cloud data, and the columnar point cloud data included in the point cloud data, respectively. Since the steps of extracting the first characteristic associated with the first point cloud data 120-1 and extracting the second characteristic associated with the second point cloud data 120-2 are identical, the following description is made only by extracting the first characteristic associated with the first point cloud data 120-1.

Characteristic extraction of ground point cloud data

Since the ground point cloud generally has a large range and a relatively uniform distribution, it is relatively easy to determine first ground point cloud data in the first point cloud data 120-1 from the first point cloud data 120-1. Therefore, in an embodiment of the present disclosure, the first ground point cloud data is first determined from the first point cloud data 120-1. It should be understood that when extracting the first characteristic associated with the first point cloud data 120-1, it is not required to first determine the first ground point cloud data, but first planar point cloud data or first columnar point cloud data may also be first determined. The order of determining the point cloud data of different categories does not affect the effects of the embodiments of the present disclosure.

In the process of extracting characteristic of ground point cloud data, the first ground point cloud data representing points of the ground in the first point cloud is first determined from the first point cloud data 120-1. In an embodiment of the present disclosure, a cumulative sum (CUSUM) algorithm is first used to detect height jump points of ground edges in a ground point cloud. Then, a growth algorithm is used in the ground point cloud. Through the above process, the first ground point cloud data may be obtained.

After obtaining the first ground point cloud data, the obtained ground point cloud is divided into small blocks of a certain area. In an embodiment of the present disclosure, the ground point cloud is divided into small squares with a side length of a, where the side length of a may be, for example, 0.5 meters or any length that is compatible with the point cloud acquisition requirements and/or the acquisition capabilities of the acquisition entity 110. It should be understood that the shapes and scale values of the small blocks are for illustrative purposes only and are not intended to limit the embodiments of the present disclosure. It should be understood that each block may include a plurality of points in the ground point cloud, the number of the points included being related to the size of the divided block.

After obtaining the divided small squares (small blocks), the center point of the small square and the corresponding normal vector for each small square are calculated, and the set of the obtained center points and corresponding normal vectors of the small squares is a characteristic that may be used to represent the first ground point cloud data, that is, the first characteristic. Since the first ground point cloud data may be represented by a much smaller number of characteristics after the above steps, the steps may also be referred to as downsampling of the point cloud data.

Alternatively, since other objects such as plants or guardrails may be included in the above divided small squares, the accuracy of the calculated center point and the corresponding normal vector for each small square may be affected. Therefore, in order to reduce no-match, after the small squares are divided, height-related information such as the height difference, the height average, and the reflectance mean may be calculated or height distribution information may be established for the points in the point cloud included in each small square, so that point cloud registration may be more accurately achieved by further comparing the above information in subsequent point cloud registration. It should be understood that this step is not obligatory and it may be performed at any time before the above information needs to be compared without causing the effects of the embodiments of the present disclosure to be unattainable. At the same time, this step may also be applied to the process of extracting characteristic of planar point cloud data and the process of extracting characteristic of columnar point cloud data.

Characteristic extraction of planar point cloud data

In the process of extracting characteristic of planar point cloud data, the first planar point cloud data representing points of the plane in the first point cloud is first determined from the first point cloud data 120-1. If the step of determining the first ground point cloud data has been completed when performing the foregoing characteristic extraction of the planar point cloud data, the first ground point cloud data may be removed from the first point cloud data 120-1, thereby significantly reducing the amount of calculation. The point cloud data obtained after removing the first ground point cloud data from the first point cloud data 120-1 may be referred to as first candidate planar point cloud data.

In the process of extracting characteristic of planar point cloud data, operations are performed for different threads (i.e., different scanning lines in the vertical direction). It should be understood that operations for different threads may be performed in parallel, thereby speeding up the operation. Each thread may include a plurality of points in the point cloud, where the number of the points is determined by the horizontal angular resolution when scanning the data. For example, since the total horizontal angle of each thread is 360 degrees, if the horizontal angular resolution is 0.1 degrees, 360÷0.1=3600 points in the point cloud are included in each thread. It should be understood that the above numerical values are for illustrative purposes only and are not intended to limit the scope of the present disclosure in any form.

Calculating the distance difference between each point and the previous point in the thread when operating on each thread, if the ratio of the distance difference to the distance of the point exceeds a specific preset threshold, then the point is considered as a breakpoint in the thread. It should be understood that this step is for distinguishing points in the first candidate planar point cloud data that may belong to different facets. Therefore, the above method of comparing the ratio of the distance difference between points to the distance of the point is merely an example, and is not a limitation to the present disclosure. In an embodiment of the present disclosure, any suitable calculation method for distinguishing points in the first candidate planar point cloud data that may belong to different facets may be employed. A thread may be divided into different segments by finding a plurality of breakpoints in the thread.

After dividing each thread into different segments using breakpoints, a set of small segments in all thread ranges may be obtained. Then, a method such as a principal component analysis (PCA) algorithm is used to calculate characteristic values such as characteristic roots and characteristic vectors of points in the point cloud included in each small segment. Therefore, the shape attribute of the small segment may be obtained through analysis, that is, the small segment is a straight line, a curve, or indistinguishable.

After obtaining the shape attribute of each small segment in the set of small segments, since it is necessary to determine the first planar point cloud data having the planar attribute, only the segments having the linear attribute are reserved, and these small segments may also be referred to as straight segments. The center point and the main direction of the points in the point cloud included in each straight segment are calculated to represent the small segment.

Then, for example, a conditional Euler clustering is performed on the straight segments reserved in the above step. The criterion of the clustering may be that the center points of the small segments are close to each other(for example, the distance between the center points is within a preset threshold distance) and the main directions are also approximate (for example, the angular difference between the main directions is within a preset threshold angle). Thus, the straight segments reserved in the above steps are clustered into a plurality of straight segment sets, where the points in the point cloud included in each straight segment set belong to different planes.

After obtaining the plurality of straight segment sets by clustering, a method such as the principal component analysis algorithm is used again to calculate characteristic values such as characteristic roots and characteristic vectors of points in the point clouds included in each straight segment set. Therefore, the shape attribute of the straight segment set may be obtained through analysis, that is, the straight segment set is a plane, non-planar or cannot be determined.

After obtaining the shape attribute of each straight segment set, since the first planar point cloud data having the planar attribute needs to be determined, only the straight segment sets having the planar attribute are reserved, and these straight segment sets may also be referred to as planar straight segment sets. The normal vectors of points in the point clouds included in each planar straight segment set are calculated, and the center points of points in the point clouds included in the planar straight segment set are calculated and obtained. Then, the points in the point clouds included in each planar straight segment set may be divided into small blocks according to the same method for downsampling of the point cloud data described in the ground point cloud data characteristic extraction process, and the center point and the corresponding normal vector of a small square is calculated for each small square. An obtained set of center points and corresponding normal vectors for each small square may be used to represent the characteristic of the first planar point cloud data, that is, the first characteristic.

Characteristic extraction of columnar point cloud data

In the process of extracting characteristic of columnar point cloud data, the first columnar point cloud data representing points of the column in the first point cloud is first determined from the first point cloud data 120-1. If the step of determining the first ground point cloud data and the step of determining the first planar point cloud data have been completed when performing the characteristic extraction of the columnar point cloud data, the first ground point cloud data and the first planar point cloud data may be removed from the first point cloud data 120-1, thereby significantly reducing the amount of calculation. The point cloud data obtained after removing the first ground point cloud data and the first planar point cloud data from the first point cloud data 120-1 may be referred to as first candidate columnar point cloud data.

After obtaining the first candidate columnar point cloud data, a method such as a principal component analysis algorithm is performed for, for example, neighborhood points within every 2 meters in the point cloud, thereby calculating the normal vector and main direction of each point. For example, a conditional Euler clustering is performed on these points. The criterion of the clustering may be that the angle between the main direction of the point and the normal vector of the ground is within a threshold angle of, for example, 5 degrees. Thus, the points in the point cloud reserved in the above step are clustered into a plurality of point sets, where the points in the point cloud included in each point set belong to one column.

Then, calculating the center point of each point set as the center of the column to which the point set belongs, and recording the normal vector and radius of the column. The obtained set of center points, normal vectors and radii for each column may be used to represent the characteristic of the first columnar point cloud data, that is, the first characteristic.

Back to method 200, at block 204, for the first characteristic associated with the first point cloud data 120-1 and the second characteristic associated with the second point cloud data 120-2 extracted by the method described above, characteristic matching is performed. The purpose of the characteristic matching is to determine whether the two characteristics correspond. This step is the basis for subsequent point cloud registration. Also, the process steps for characteristic matching of the extracted first characteristic and second characteristic are different based on the difference in categories of points in the point cloud. The process of characteristic matching the extracted first characteristic and the second characteristic is described below for the extracted first characteristic and the extracted second characteristic respectively being the ground point cloud data characteristic, the planar point cloud data characteristic, and the columnar point cloud data characteristic.

Characteristic matching of ground point cloud data

In the characteristic matching of ground point cloud data, the first characteristic and the second characteristic in the form of the ground point cloud data characteristic are converted into the same coordinate system using a rotation matrix.

After converting the first characteristic and the second characteristic into the same coordinate system, determining a distance between a characteristic point in the first characteristic (i.e., the center point of a small block in the ground point cloud data) and a corresponding characteristic point in the second characteristic. When the distance is less than a predetermined threshold distance, determining a difference between the normal vector of the characteristic point and the normal vector of the corresponding characteristic point. If the difference is less than a predetermined threshold difference, it may be determined that the two characteristic points match. Alternatively, this step may also be embodied as: for a characteristic point in the first characteristic, searching the second characteristic for a characteristic point having a distance difference and a normal vector difference less than corresponding predetermined thresholds to the characteristic point in the first characteristic. After the point cloud is adjusted according to the matching relationship between the two characteristic points, if the distance difference and the normal vector difference between the corresponding characteristic points satisfying a threshold ratio (e.g., any ratio between 70%-100%) in the first characteristic and the second characteristic are within corresponding predetermined thresholds (here, the predetermined thresholds are not necessarily the same as the predetermined thresholds described above, but may be smaller in value, thereby making the judgment made this time more strict), then it may be determined that the two characteristic points match. After determining that the two characteristic points respectively from the first characteristic and the second characteristic match, the matching of the two characteristic points is recorded in the first point cloud data 120-1 and the second point cloud data 120-2 to which the two characteristic points belong. In this matching process, it is necessary to determine whether a match is made for all or most of the characteristic points in the first characteristic and the second characteristic, so that a matching result of the first point cloud data 120-1 and the second point cloud data 120-2 may be obtained. The determination of matching or not for different characteristic points may be done in parallel.

Characteristic matching of planar point cloud data

In the characteristic matching of planar point cloud data, the first characteristic and the second characteristic in the form of the planar point cloud data characteristic are converted into the same coordinate system using a rotation matrix.

After converting the first characteristic and the second characteristic into the same coordinate system, determining a distance between a characteristic point in the first characteristic (i.e., the center point of a small block in the planar point cloud data) and a corresponding characteristic point in the second characteristic. When the distance is less than a predetermined threshold distance, determining a difference between the normal vector of the characteristic point and the normal vector of the corresponding characteristic point. If the difference is less than a predetermined threshold difference, it may be determined that the two characteristic points match. Alternatively, this step may also be embodied as: for a characteristic point in the first characteristic, searching the second characteristic for a characteristic point having a distance difference and a normal vector difference less than corresponding predetermined thresholds to the characteristic point in the first characteristic. After the point cloud is adjusted according to the matching relationship between the two characteristic points, if the distance difference and the normal vector difference between the corresponding characteristic points satisfying a threshold ratio (e.g., any ratio between 70%-100%) in the first characteristic and the second characteristic are within corresponding predetermined thresholds (here, the predetermined thresholds are not necessarily the same as the predetermined thresholds described above, but may be smaller in value, thereby making the judgment made this time more strict), then it may be determined that the two characteristic points match. After determining that the two characteristic points respectively from the first characteristic and the second characteristic match, the matching of the two characteristic points is recorded in the first point cloud data 120-1 and the second point cloud data 120-2 to which the two characteristic points belong. In this matching process, it is necessary to determine whether a match is made for all or most of the characteristic points in the first characteristic and the second characteristic, so that a matching result of the first point cloud data 120-1 and the second point cloud data 120-2 may be obtained. The determination of matching or not for different characteristic points may be done in parallel.

Characteristic matching of columnar point cloud data

In the characteristic matching of columnar point cloud data, the first characteristic and the second characteristic in the form of the columnar point cloud data characteristic are converted into the same coordinate system by a rotation matrix.

After converting the first characteristic and the second characteristic into the same coordinate system, determining a distance between a characteristic point in the first characteristic (i.e., the center point of the column) and a corresponding characteristic point in the second characteristic. When the distance is less than a predetermined threshold distance, determining a difference between the normal vector and radius of the characteristic point and the normal vector and radius of the corresponding characteristic point, If the difference is less than a predetermined threshold difference, it may be determined that the two characteristic points match. Alternatively, this step may also be embodied as: searching for other characteristic points from the second characteristic within a predetermined range around a characteristic point in the first characteristic. If the difference between the normal vector and radius of the characteristic point in the first characteristic and the normal vector and radius of a characteristic point in the second characteristic is less than a predetermined threshold difference and is less than the difference between the normal vector and radius of the characteristic point in the first characteristic and the normal vector and radius of any other characteristic point in the second characteristic in the range, then it may be determined that the two characteristic points match. After determining that the two characteristic points respectively from the first characteristic and the second characteristic match, the matching of the two characteristic points is recorded in the first point cloud data 120-1 and the second point cloud data 120-2 to which the two characteristic points belong. In this matching process, it is necessary to determine whether a match is made for all or most of the characteristic points in the first characteristic and the second characteristic, so that a matching result of the first point cloud data 120-1 and the second point cloud data 120-2 may be obtained. The determination of matching or not for different characteristic points may be done in parallel.

Then, at block 206, determining a matching relationship between the first point cloud data 120-1 and the second point cloud data 120-2 based on the characteristic matching between the first characteristic and the second characteristic, the characteristic matching being obtained using the step described in block 204. As mentioned above, the matching relationship between different point clouds includes a spatial transformation relationship between different point clouds, that is, how a point cloud is transformed into another point cloud through operations such as rotation, translation, and angle transformation. When determining the matching relationship between the first point cloud data 120-1 and the second point cloud data 120-2, no matter whether the first point cloud data 120-1 and the second point cloud data 120-2 include ground point cloud data, planar point cloud data, or columnar point cloud data, the process steps performed are identical.

After determining that the first point cloud data 120-1 matches the second point cloud data 120-2, for the corresponding point cloud data (i.e., the ground point cloud data, the planar point cloud data, or the columnar point cloud data), a method such as a random sampling consistency (RANSAC) algorithm is used to determine the matching relationship between the first point cloud data 120-1 and the second point cloud data 120-2, such that at least a majority of the characteristics in the first characteristic of the first point cloud data 120-1 and the second characteristic of the second point cloud data 120-2 satisfy the matching relationship. According to an embodiment of the present disclosure, when the matching relationship between the first point cloud data 120-1 and the second point cloud data 120-2 is determined using a method such as the RANSAC algorithm, an iterative loop may be performed for each matched characteristic point to find the matching relationship. However, for a plurality of matched characteristic points, it is also possible to simultaneously find the matching relationship for the plurality of characteristic points, for example, by taking a median value, so that the amount of calculation may be reduced accordingly.

Since the point cloud data are classified into three categories, namely, ground point cloud data, planar point cloud data, and columnar point cloud data, there is no need to find the matching relationship between the first point cloud data 120-1 and the second point cloud data 120-2 simultaneously for 6 degrees of freedom, but the matching relationship may be found for different degrees of freedom for different categories of point cloud data. For example, ground point cloud data may be used to adjust height error (z) and rotation error, and planar point cloud data and columnar point cloud data may be used to adjust plane error (x, y) and angle error.

The flow of the method 200 for determining a matching relationship between point cloud data is described above from the perspective of the computing device 130 with reference to FIG. 2. It should be understood that the above description from the perspective of the computing device 130 has been made in order to better illustrate the content described in the present disclosure, and is not a limitation in any way.

From the above description with reference to FIGS. 1 and 2, it may be seen that the technical solution according to the embodiments of the present disclosure has many advantages over the existing technology. Since the above technical solution only needs to register for different characteristics generated from points in the point cloud without registering for all the points in the point cloud, the amount of calculation required for registration may be greatly reduced. At the same time, since the points in the point cloud are classifed into different categories, and the points of different categories correspond to different degrees of freedom, it is possible to register only part of the degrees of freedom at a time without registration for 6 degrees of freedom at the same time. Therefore, it may save computing resources and storage resources, and may improve the operation speed and avoid individual mismatches to cause an overall matching error. Furthermore, compared with manually extracting points with specific characteristics for the same object to determine a matching relationship between point cloud data, the above technical solution does not require high density of point clouds acquired by the acquisition entity 110, and the error requirements for raw data are not high.

Figure 3:
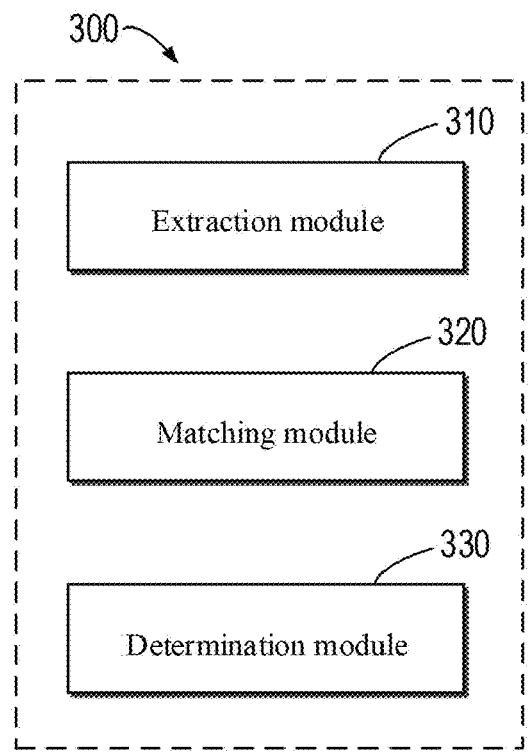
FIG. 3 illustrates a block diagram of an apparatus 300 for determining a matching relationship between point cloud data according to an embodiment of the present disclosure.

FIG. 3 illustrates a block diagram of an apparatus 300 according to an embodiment of the present disclosure. For example, the method 200 for determining a matching relationship between point cloud data as shown in FIG. 2 may be implemented by the apparatus 300. As shown in FIG. 3, the apparatus 300 may include an extraction module 310, configured to extract a first characteristic associated with first point cloud data and a second characteristic associated with second point cloud data, the first point cloud data and the second point cloud data being acquired for the same object. The apparatus 300 may further include a matching module 320, configured to perform characteristic matching between the first characteristic and the second characteristic. The apparatus 300 may further include a determination module 330, configured to determine, based on the characteristic matching, a matching relationship between the first point cloud data and the second point cloud data.

Some optional modules of the apparatus 300 are not shown in FIG. 3 for the purpose of clarity. However, it should be understood that the various features described above with respect to FIGS. 1-2 are equally applicable to the apparatus 300. Moreover, each module of the apparatus 300 may be a hardware module or a software module. For example, in some embodiments, the apparatus 300 may be implemented in part or in whole using software and/or firmware, such as implemented as a computer program product included in a computer readable medium. Alternatively or additionally, the apparatus 300 may be implemented in part or in whole based on hardware, such as implemented as an integrated circuit (IC), an application specific integrated circuit (ASIC), a system on a chip (SOC), and a field programmable gate array (FPGA). The scope of the present disclosure is not limited in this respect.

Figure 4:
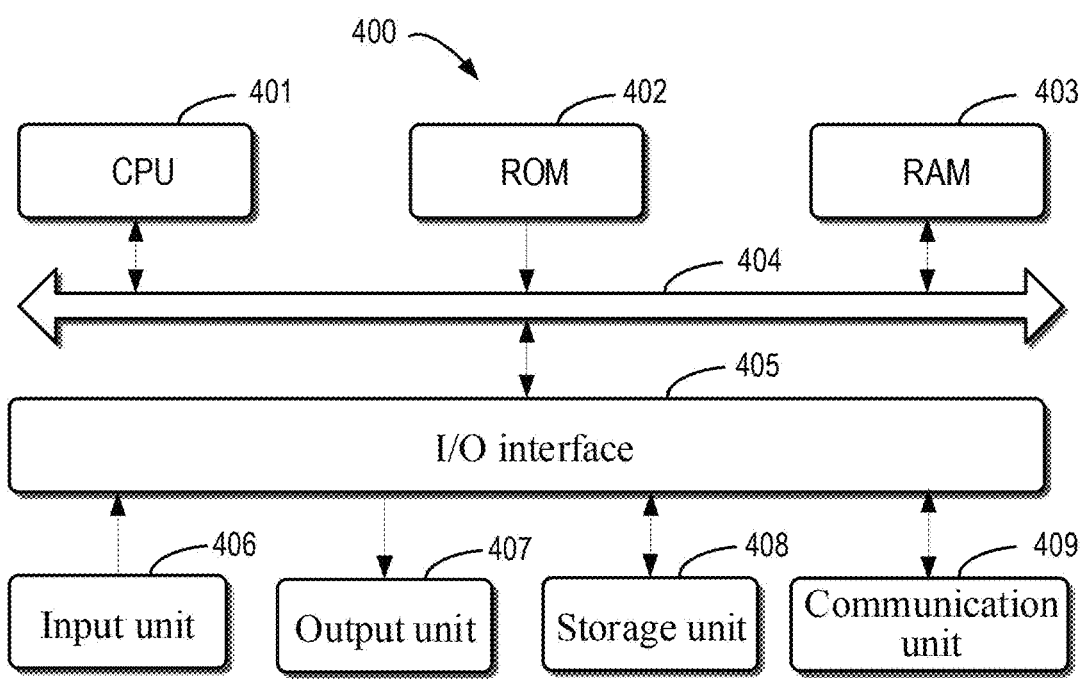
FIG. 4 illustrates a schematic block diagram of a device 400 that may be used to implement the embodiments of the present disclosure.

FIG. 4 illustrates a schematic block diagram of a device 400 capable of implementing various embodiments of the present disclosure. As shown in the figure, the device 400 includes a central processing unit (CPU) 401 that may perform various appropriate actions and processing in accordance with computer program instructions stored in a read only memory (ROM) 402 or computer program instructions loaded into a random access memory (RAM) 403 from a storage unit 408. In the RAM 403, various programs and data required for the operation of the device 400 may also be stored. The CPU 401, the ROM 402, and the RAM 403 are connected to each other through a bus 404. An input/output (I/O) interface 405 is also coupled to the bus 404.

A plurality of components in the device 400 are coupled to the I/O interface 405, including: an input unit 406, such as a keyboard or a mouse; an output unit 407, such as various types of displays, or speakers; the storage unit 408, such as a disk or an optical disk; and a communication unit 409 such as a network card, a modem, or a wireless communication transceiver. The communication unit 409 allows the device 400 to exchange information/data with other devices over a computer network such as the Internet and/or various telecommunication networks.

The various processes and processing described above, such as the method 200, may be performed by the processing unit 401. For example, in some embodiments, the method 200 may be implemented as a computer software program that is tangibly embodied in a machine readable medium, such as the storage unit 408. In some embodiments, some or all of the computer programs may be loaded and/or installed onto the device 400 via the ROM 402 and/or the communication unit 409. When a computer program is loaded into the RAM 403 and executed by the CPU 401, one or more of the actions of the method 200 described above may be performed.

Some embodiments of the present disclosure may be a method, apparatus, system, and/or computer program product. The computer program product may include a computer readable storage medium having computer readable program instructions thereon for performing various aspects of some embodiments of the present disclosure.

A computer readable storage medium may be a tangible device that may hold and store the instructions used by the instruction execution devices. The computer readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of the computer readable storage medium include: a portable computer disk, hard disk, random access memory (RAM), read only memory (ROM), erasable programmable read only memory (EPROM or flash memory), static random access memory (SRAM), portable compact disk read only memory (CD-ROM), digital versatile disk (DVD), memory stick, floppy disk, mechanical encoding device, for example, a punch card or a raised structure in a groove on which an instruction is stored, and any suitable combination of the above. The computer readable storage medium as used herein is not to be interpreted as a transient signal itself, such as radio waves or other freely propagating electromagnetic waves, electromagnetic waves propagating through a waveguide or other transmission mediums (e.g., light pulses through a fiber optic cable), or electrical signals transmitted through wires.

The computer readable program instructions described herein may be downloaded from a computer readable storage medium to various computing/processing devices or downloaded to an external computer or external storage device via a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer readable program instructions from the network and forwards the computer readable program instructions for storage in the computer readable storage medium in each computing/processing device.

Computer program instructions for performing the operations of some embodiments of the present disclosure may be assembly instructions, instruction set architecture (ISA) instructions, machine instructions, machine related instructions, microcode, firmware instructions, state setting data, or source code or object code written in any combination of one or more programming languages, the programming languages including object oriented programming languages such as Smalltalk, and C++, as well as conventional procedural programming languages such as the "C" language or similar programming languages. The computer readable program instructions may execute entirely on the user's computer, partly on the user's computer, as a stand-alone software package, partly on the user's computer and partly on a remote computer, or entirely on a remote computer or server. In the case of a remote computer, the remote computer may be connected to the user computer through any kind of network, including a local area network (LAN) or a wide area network (WAN), or may be connected to an external computer (e.g., using an Internet service provider to connect via the Internet). In some embodiments, electronic circuits are personalizing customized by using state information of computer readable program instructions, such as programmable logic circuits, field programmable gate arrays (FPGA), or programmable logic arrays (PLA). The electronic circuit may execute computer readable program instructions to implement various aspects of some embodiments of the present disclosure.

Various aspects of some embodiments of the present disclosure are described herein with reference to the flowcharts and/or block diagrams of the method, apparatus, and computer program product according to the embodiments of the present disclosure. It should be understood that each block of the flowcharts and/or block diagrams and combination of the blocks in the flowcharts and/or block diagrams may be implemented by the computer readable program instructions.

These computer readable program instructions may be provided to a processing unit of a general purpose computer, special purpose computer or other programmable data processing apparatus to produce a machine such that the instructions, when executed by the processing unit of the computer or other programmable data processing apparatus, produce an apparatus for implementing the functions/actions specified in one or more blocks of the flowcharts and/or block diagrams. The computer readable program instructions may also be stored in a computer readable storage medium that cause the computer, programmable data processing apparatus and/or other device to operate in a particular mode, such that the computer readable medium storing the instructions includes a manufactured product that includes instructions for implementing various aspects of the functions/actions specified in one or more blocks of the flowcharts and/or block diagrams.

Computer readable program instructions may also be loaded onto a computer, other programmable data processing apparatus, or other device to perform a series of operational steps on the computer, other programmable data processing apparatus or other device to produce a computer-implemented process such that the instructions executed on the computer, other programmable data processing apparatus, or other device implement the functions/actions specified in one or more blocks of the flowcharts and/or block diagrams.

The flowchart and block diagrams in the accompanying drawings illustrate the architecture, functionality, and operation of possible implementations of the system, method, and computer program product according to the various embodiments of the present disclosure. In this regard, each block of the flowchart or block diagram may represent a module, a program segment, or a portion of an instruction that includes one or more executable instructions for implementing specified logic functions. In some alternative implementations, the functions noted in the blocks may also occur in a different order than that illustrated in the drawings. For example, two consecutive blocks may be executed substantially in parallel, and they may sometimes be executed in a reverse order, depending upon the functionality involved. It should also be noted that each block of the flowcharts and/or block diagrams, and combinations of blocks in the flowcharts and/or block diagrams, may be implemented in a dedicated hardware-based system that performs the specified function or action, or may be implemented by a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope and spirits of the embodiments of the present disclosure. The choice of terms used herein is intended to best explain the principles, practical applications, or technical improvements to the technology in the market for various embodiments, or to enable those skilled in the art to understand the various embodiments disclosed herein.

What is claimed is:

1. A method for determining a matching relationship between point cloud data, the method comprising:
extracting a first characteristic associated with first point cloud data and a second characteristic associated with second point cloud data, the first point cloud data and the second point cloud data being acquired for a same object;
performing characteristic matching between the first characteristic and the second characteristic; and
determining, based on the characteristic matching, a matching relationship between the first point cloud data and the second point cloud data,
wherein the extracting the first characteristic and the second characteristic comprises:
determining first candidate columnar point cloud data from the first point cloud data, and determining the first characteristic based on the first candidate columnar point cloud data; and
determining second candidate columnar point cloud data from the second point cloud data, and determining the second characteristic based on the second candidate columnar point cloud data,
the determining the first characteristic based on the first candidate columnar point cloud data comprises:
clustering point cloud data having an angle between a main direction and a ground normal vector less than a threshold angle in the first candidate columnar point cloud data; and
determining, in response to a clustering result indicating that the first candidate columnar point cloud data comprising columnar point cloud data, a center point, a normal vector, and a radius of the columnar point cloud data as a characteristic point, a normal vector and a radius of the first characteristic,
wherein the method is performed by at least one processor.

2. The method according to claim 1, wherein the second characteristic includes at least a characteristic point and a normal vector corresponding to the characteristic point.

3. The method according to claim 1, wherein the extracting the first characteristic and the second characteristic comprises:
determining first ground point cloud data from the first point cloud data, and determining a center point of the first ground point cloud data and a corresponding normal vector as a second characteristic point and a second corresponding normal vector of the first characteristic; and
determining second ground point cloud data from the second point cloud data, and determining a center point of the second ground point cloud data and a corresponding normal vector as a characteristic point and a corresponding normal vector of the second characteristic.

4. The method according to claim 1, wherein the extracting the first characteristic and the second characteristic comprises:
determining first candidate planar point cloud data from the first point cloud data, and determining the first characteristic based on the first candidate planar point cloud data; and
determining second candidate planar point cloud data from the second point cloud data, and determining the second characteristic based on the second candidate planar point cloud data.

5. The method according to claim 4, wherein the determining the first characteristic based on the first candidate planar point cloud data comprises:
determining a breakpoint of a thread in the first candidate planar point cloud data;
segmenting the thread based on the breakpoint;
clustering the segmented thread; and
determining, in response to a clustering result indicating that the first candidate planar point cloud data comprising planar point cloud data, a center point of the planar point cloud data and a corresponding normal vector as a third characteristic point and a third corresponding normal vector of the first characteristic.

6. The method according to claim 3, wherein the performing characteristic matching between the first characteristic and the second characteristic comprises:
converting the first characteristic and the second characteristic into a same coordinate system;
determining a distance between the characteristic point of the first characteristic and the characteristic point of the second characteristic;
determining a difference between the normal vector of the first characteristic and the normal vector of the second characteristic, in response to the distance being less than a threshold distance; and
determining the first characteristic matching the second characteristic, in response to the difference being less than a threshold difference.

7. The method according to claim 1, wherein the performing characteristic matching between the first characteristic and the second characteristic comprises:
converting the first characteristic and the second characteristic into a same coordinate system;
determining a distance between the characteristic point of the first characteristic and a characteristic point of the second characteristic;
determining a difference between the normal vector and the radius of the first characteristic and a normal vector and a radius of the second characteristic, in response to the distance being less than a threshold distance; and
determining the first characteristic matching the second characteristic, in response to the difference being less than a threshold difference.

8. The method according to claim 1, wherein the determining a matching relationship between the first point cloud data and the second point cloud data comprises:
determining the matching relationship between the first point cloud data and the second point cloud data, in response to the first point cloud data matching the second point cloud data.

9. An apparatus for determining a matching relationship between point cloud data, the apparatus comprising:
   at least one processor; and
   a memory storing instructions, the instructions when executed by the at least one processor, cause the at least one processor to perform operations, the operations comprising:
   extracting a first characteristic associated with first point cloud data and a second characteristic associated with second point cloud data, the first point cloud data and the second point cloud data being acquired for a same object;
   performing characteristic matching between the first characteristic and the second characteristic; and
   determining, based on the characteristic matching, a matching relationship between the first point cloud data and the second point cloud data
   wherein the extracting the first characteristic and the second characteristic comprises:
      determining first candidate columnar point cloud data from the first point cloud data, and determining the first characteristic based on the first candidate columnar point cloud data; and
      determining second candidate columnar point cloud data from the second point cloud data, and determining the second characteristic based on the second candidate columnar point cloud data, the determining the first characteristic based on the first candidate columnar point cloud data comprises:
         clustering point cloud data having an angle between a main direction and a ground normal vector less than a threshold angle in the first candidate columnar point cloud data; and
         determining, in response to a clustering result indicating that the first candidate columnar point cloud data comprising columnar point cloud data, a center point, a normal vector, and a radius of the columnar point cloud data as a characteristic point, a normal vector and a radius of the first characteristic.

10. The apparatus according to claim 9, wherein the first characteristic and the second characteristic each include at least a characteristic point and a normal vector corresponding to the characteristic point.

11. The apparatus according to claim 9, wherein the extracting the first characteristic and the second characteristic comprises:
   determining first ground point cloud data from the first point cloud data, and determining a center point of the first ground point cloud data and a corresponding normal vector as a second characteristic point and a second corresponding normal vector of the first characteristic; and
   determining second ground point cloud data from the second point cloud data, and determining a center point of the second ground point cloud data and a corresponding normal vector as a characteristic point and a corresponding normal vector of the second characteristic.

12. The apparatus according to claim 9, wherein the extracting the first characteristic and the second characteristic comprises:
   determining first candidate planar point cloud data from the first point cloud data, and determining the first characteristic based on the first candidate planar point cloud data; and
   determining second candidate planar point cloud data from the second point cloud data, and determining the second characteristic based on the second candidate planar point cloud data.

13. The apparatus according to claim 12, wherein the determining the first characteristic based on the first candidate planar point cloud data comprises:
   determining a breakpoint of a thread in the first candidate planar point cloud data;
   segmenting the thread based on the breakpoint;
   clustering the segmented thread; and
   determining, in response to a clustering result indicating that the first candidate planar point cloud data comprising planar point cloud data, a center point of the planar point cloud data and a corresponding normal vector as a third characteristic point and a third corresponding normal vector of the first characteristic.

14. The apparatus according to claim 11, wherein the performing characteristic matching between the first characteristic and the second characteristic comprises:
   converting the first characteristic and the second characteristic into a same coordinate system;
   determining a distance between the characteristic point of the first characteristic and the characteristic point of the second characteristic;
   determining a difference between the normal vector of the first characteristic and the normal vector of the second characteristic, in response to the distance being less than a threshold distance; and
   determining the first characteristic matching the second characteristic, in response to the difference being less than a threshold difference.

15. The apparatus according to claim 9, wherein the performing characteristic matching between the first characteristic and the second characteristic comprises:
   converting the first characteristic and the second characteristic into a same coordinate system;
   determining a distance between the characteristic point of the first characteristic and a characteristic point of the second characteristic;
   determining a difference between the normal vector and the radius of the first characteristic and a normal vector and a radius of the second characteristic, in response to the distance being less than a threshold distance; and
   determining the first characteristic matching the second characteristic, in response to the difference being less than a threshold difference.

16. The apparatus according to claim 9, wherein the determining a matching relationship between the first point cloud data and the second point cloud data comprises:
   determining the matching relationship between the first point cloud data and the second point cloud data, in response to the first point cloud data matching the second point cloud data.

17. A non-transitory computer storage medium storing a computer program, the computer program when executed by one or more processors, causes the one or more processors to perform operations, the operations comprising:
   extracting a first characteristic associated with first point cloud data and a second characteristic associated with second point cloud data, the first point cloud data and the second point cloud data being acquired for a same object;
   performing characteristic matching between the first characteristic and the second characteristic; and determining, based on the characteristic matching, a matching relationship between the first point cloud data and the second point cloud data wherein the extracting the first characteristic and the second characteristic comprises:

determining first candidate columnar point cloud data from the first point cloud data, and determining the first characteristic based on the first candidate columnar point cloud data; and determining second candidate columnar point cloud data from the second point cloud data, and determining the second characteristic based on the second candidate columnar point cloud data, the determining the first characteristic based on the first candidate columnar point cloud data comprises:

clustering point cloud data having an angle between a main direction and a ground normal vector less than a threshold angle in the first candidate columnar point cloud data; and determining, in response to a clustering result indicating that the first candidate columnar point cloud data comprising columnar point cloud data, a center point, a normal vector, and a radius of the columnar point cloud data as a characteristic point, a normal vector and a radius of the first characteristic.

* * * * *